United States Patent [19]
Drowley et al.

[11] Patent Number: 5,232,547
[45] Date of Patent: Aug. 3, 1993

[54] SIMULTANEOUSLY MEASURING THICKNESS AND COMPOSITION OF A FILM

[75] Inventors: Clifford I. Drowley; Marco Racanelli, both of Phoenix; Phillip H. Williams, Mesa, all of Ariz.

[73] Assignee: Motorola, Inc., Schaumburg, Ill.

[21] Appl. No.: 907,271

[22] Filed: Jul. 1, 1992

[51] Int. Cl.⁵ .................... G01B 11/00; G01N 11/02
[52] U.S. Cl. ........................ 156/601; 437/8; 356/357; 356/359; 356/360
[58] Field of Search ................ 356/353–363; 156/DIG. 67, 601; 437/921, 976, 8

[56] References Cited

U.S. PATENT DOCUMENTS

| | | | |
|---|---|---|---|
| 4,872,758 | 10/1989 | Miyazaki et al. | 356/381 |
| 5,091,320 | 2/1992 | Aspnes et al. | 156/601 |
| 5,096,533 | 3/1992 | Igarashi | 437/8 |
| 5,129,724 | 7/1992 | Brophy et al. | 356/360 |

Primary Examiner—Olik Chaudhuri
Assistant Examiner—Ramamohan Rao Paladugu
Attorney, Agent, or Firm—Joe E. Barbee

[57] ABSTRACT

A semiconductor wafer (11) with a lattice mismatched film (12) on its upper surface is placed on a flat support surface (15). A laser beam (13, 23, 24, 26, 27) is directed onto the film (12). Curvature of the semiconductor wafer caused by the film (12) is measured simultaneously with film thickness based on characteristics of the reflected laser beam (23, 24, 26, 27). Strain within the film (12) is calculated from the curvature of the semiconductor wafer, film composition is calculated from the stress and thickness based on known properties of the film (12).

6 Claims, 1 Drawing Sheet

SIMULTANEOUSLY MEASURING THICKNESS AND COMPOSITION OF A FILM

BACKGROUND OF THE INVENTION

The present invention relates, in general, to measuring film characteristics, and more particularly to simultaneously measuring thickness and composition of a lattice mismatched film on a semiconductor wafer.

Fabrication of many semiconductor devices requires the formation of a thin film on a semiconductor wafer, the thin film having a tightly controlled composition and thickness. According to the prior art, film composition was measured by methods such as secondary ion mass spectroscopy (SIMS), Rutherford backscattering spectroscopy (RBS) or Auger electron spectroscopy (AES). Film thickness was measured separately using transmission electron microscopy (TEM). The SIMS, RBS, AES and TEM methods require the use of equipment costing $2,000,000 to $3,000,000. These methods take over 20 hours for the two measurements and destroys the sample during the measurement process.

Ellipsometry is a method which uses polarized light to measure film thickness. Ellipsometry is economical, fast and does not damage the sample. According to the prior art however, a separate measurement using SIMS, RBS, or AES would still be required to measure film composition. As a result, typically one measurement was performed using SIMS, RBS, or AES to determine film composition and a second measurement was performed using TEM to determine film thickness. Details of these measurement methods as applied to films on semiconductor wafers are found in "SEMICONDUCTOR MATERIAL AND DEVICE CHARACTERIZATION" by D. K. Schroder, published in 1990 by John Wiley and Sons, Inc., which is incorporated herein by reference.

There is a need for a film measurement method which can be used for process control in a semiconductor manufacturing process. The method must not destroy or damage the workpiece and must be performed rapidly with a minimum of time and expense. Measuring both composition and thickness simultaneously is particularly desirable since the potential for error is reduced as well as further reducing the total measurement time.

SUMMARY OF THE INVENTION

Briefly stated, the present invention provides a film measurement method which is suited for process control in a semiconductor manufacturing process. A semiconductor wafer with a lattice mismatched film on the upper surface is placed on a flat support surface and laser beams are directed at the surface of the film. Based on characteristics of the reflected laser beams, wafer bow and film thickness are measured simultaneously. Strain within the film is calculated from the wafer bow, composition of the film is calculated from stress and thickness.

DETAILED DESCRIPTION OF THE DRAWINGS

Figure 1:
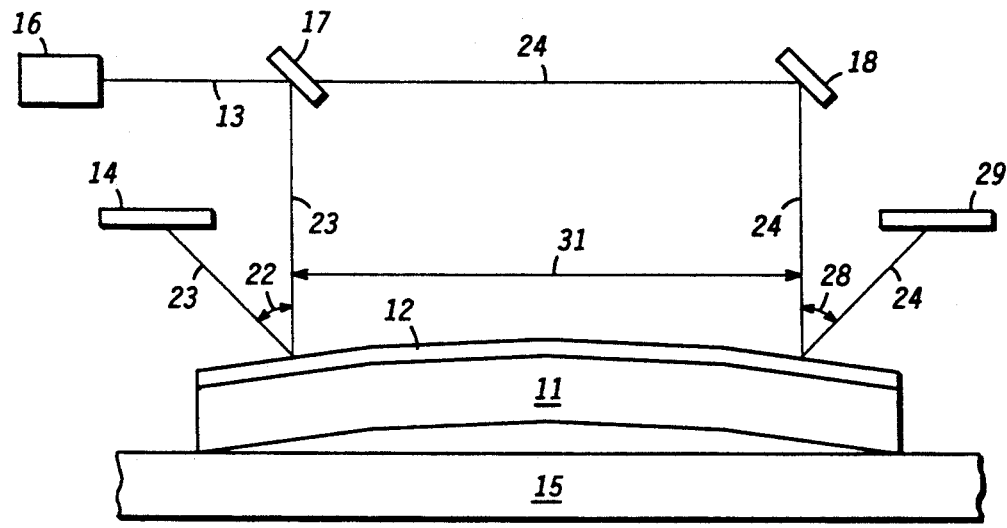
FIG. 1 shows an apparatus for measuring stress in a film on the surface of a semiconductor wafer according to the prior art.

FIG. 1 shows an apparatus for measuring stress in a film 12 on an upper surface of a semiconductor wafer 11 according to the prior art. The apparatus is described more fully in "THIN FILMS STRESS MEASUREMENT SYSTEM OPERATION MANUAL. MODEL F2300", published by FLEXUS INCORPORATED in May 1990, which is incorporated herein by reference. Semiconductor wafer 11 is typically a silicon material having a <100> crystal orientation.

Semiconductor wafer 11 is supported in a fixed position on a flat surface 15. A laser 16 generates a laser beam 13 which is split into a first split laser beam 23 and a second split laser beam 24 by a beam splitter 17. First split laser beam 23 is directed onto film 12 at a predetermined angle and location with respect to flat surface 15. First split laser beam 23 is then reflected from film 12 forming an angle of reflection 22 with respect to the incident angle of first split laser beam 23. Angle of reflection 22 is measured by a first detector 14. A mirror 18 likewise reflects second split laser beam 24 onto film 12 at a second predetermined angle and at a second predetermined location which is a separation distance 31 from the first predetermined location. Second split laser beam 24 is then reflected from film 12 forming an angle of reflection 28. Angle of reflection 28 is measured by a second detector 29. The radius of curvature of semiconductor wafer 11 is calculated geometrically using angle of reflection 22, angle of reflection 28, and separation distance 31 according to an equation 1:

$$R = \frac{d}{2 \sin\left(\frac{\Theta}{2}\right)} \tag{1}$$

Where:
R is semiconductor wafer radius of curvature.
d is separation distance 31.
$\Theta$ is the mean of angle 22 and angle 28.

The stress in film 12 is then calculated using R, the radius of curvature of film 12, with an equation 2:

$$\sigma = \frac{Eh^2}{(1-\gamma)6Rt} \tag{2}$$

where
$\sigma$ is average stress in film 12.
E is the modulus of elasticity.
$\gamma$ is Poisson's ratio.
h is semiconductor wafer thickness.
t is film thickness.
R is semiconductor wafer 11 effective radius of curvature.

Typically semiconductor wafer 11 is slightly bowed even before deposition of film 12. As a result measurement of semiconductor wafer 11 radius of curvature is performed both before ($R_1$) and after ($R_2$) deposition of film 12 and the effective radius of curvature (R) is found from an equation 3:

$$R = \frac{1}{\frac{1}{R_2} - \frac{1}{R_1}} \tag{3}$$

The effective radius of curvature (R) is used to calculate average stress in film 12.

Figure 2:
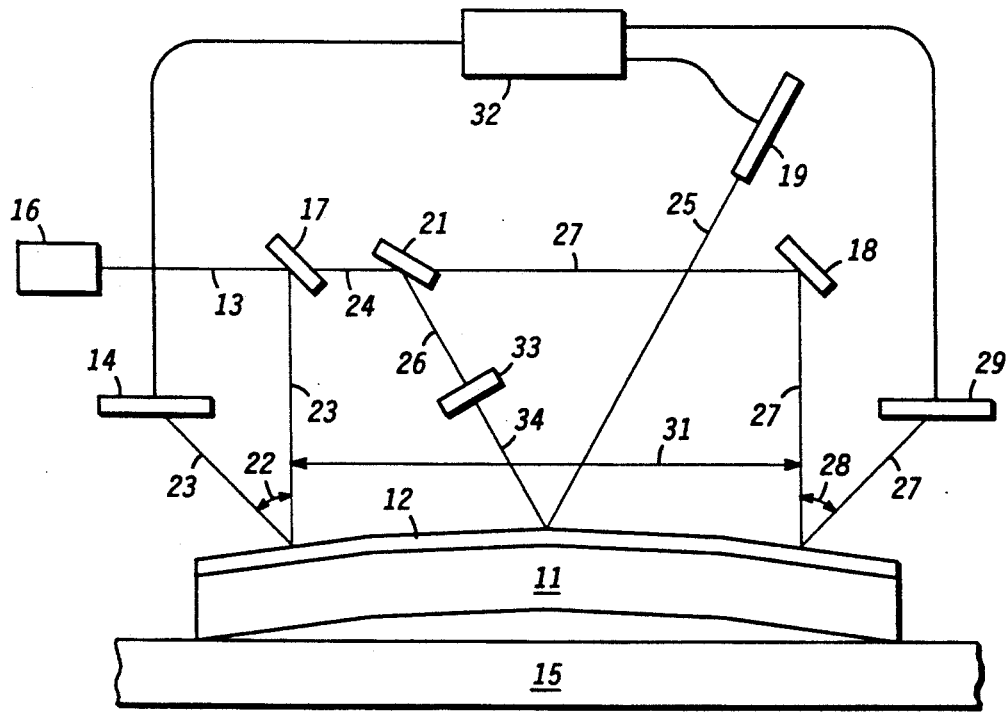
FIG. 2 shows the apparatus of FIG. 1 combined with an ellipsometric analyzer as a preferred embodiment in accordance with the present invention.

FIG. 2 shows the apparatus of FIG. 1 combined with an ellipsometric analyzer 19 as a preferred embodiment in accordance with the present invention. Combining the stress measurement apparatus of FIG. 1 with ellipsometric analyzer 19 allows both film stress and film thickness to be measured simultaneously. A beam splitter 21 divides second split laser beam 24 into a third split laser beam 26 27 is directed onto mirror 18, film 12 and second detector 29. Beam splitter 21 directs third split laser beam 26 into a polarizer 33 which outputs a polarized light beam 34. Polarized light beam 34 has the polarization characteristic of elliptical polarization. Polarized light beam 34 is directed onto film 12 at a third predetermined angle and location. Film 12 in turn reflects polarized light beam 34 to a reflected polarized beam 25. Reflected polarized beam 25 has a polarization characteristic which depends upon thickness of film 12. Reflected polarized beam 25 is directed into ellipsometric analyzer 19. Ellipsometric analyzer 19 measures film thickness of film 12 by analyzing the ellipsometric angles of the reflected polarized beam 25. A more complete description of the operation of ellipsometric analyzer 19 is found in "SEMICONDUCTOR MATERIAL AND DEVICE CHARACTERIZATION" on pages 459 to 465. A computing means 32 calculates thickness and composition of film 12 based on the measurements from ellipsometric analyzer 19, first detector 14 and second detector 29. Typically computing means 32 is a small computer such as an Apollo DN3000 which is programmed to perform the required calculations.

Using angle of reflection 22, angle of reflection 28, and separation distance 31, a radius of curvature is calculated for semiconductor wafer 11 using equation 1. Stress is found using equation 2 and strain in film 12 is calculated using an equation 4:

$$\epsilon = C\sigma \qquad (4)$$

Where:
  $\epsilon$ is strain in film 12.
  C is a constant found empirically or from tabulated material properties.
  $\sigma$ is average stress in film 12.

Physical properties of film 12 are then used to calculate the composition of film 12. Film 12 has a crystal lattice which is mismatched with that of the silicon crystal. Film 12 is typically an epitaxial layer formed from an alloy such as SiGe, but could also be InGaAs deposited on a GaAs wafer. For a film composed of SiGe over Si, strain is due to lattice mismatch between the crystal lattices. Since Ge has a lattice which is approximately 4% larger than that of Si, the relationship between strain and Ge concentration is calculated using an equation 5:

$$x \approx \frac{\epsilon}{0.04} \qquad (5)$$

Where:
  x is concentration of Ge in SiGe film.
  $\epsilon$ is strain in film 12.

Both thickness and composition of film 12 is determined simultaneously in a single operation, reducing both parts handling and the potential for operator error. Thickness is measured directly and film composition is calculated based on thickness and the measured strain in film 12. The film measurement method is suited for process control in a semiconductor manufacturing process. The method does not damage or destroy the workpiece and can be performed in approximately 2 minutes, compared with a total time of over 20 hours for the prior art. The film stress measurement equipment modified to include an ellipsometric analyzer costs approximately $100,000 compared with $2,000,000 to $3,000,000 for the electron microscopy equipment required for prior art methods.

We claim:

1. A method for simultaneously measuring thickness and composition of a film comprising a lattice mismatched epitaxial layer on an upper surface of a semiconductor wafer, comprising:
    placing the wafer on a flat support surface;
    measuring curvature of the semiconductor wafer;
    measuring film thickness;
    calculating film strain based on film thickness and curvature of the semiconductor wafer; and
    calculating film composition from film strain based on physical properties of film.

2. The method for simultaneously measuring thickness and composition of a film of claim 1 wherein forming the film comprises depositing an alloy of silicon and germanium on a silicon wafer.

3. The method for simultaneously measuring thickness and composition of a film of claim 1 wherein forming the film comprises depositing an alloy of indium and gallium arsenide on a gallium arsenide wafer.

4. The method for simultaneously measuring thickness and composition of a film of claim 1 wherein measuring curvature of the semiconductor wafer comprises:
    reflecting a laser beam from the surface of the film on the semiconductor wafer;
    measuring the angle of reflection of the laser beam; and
    computing a radius of curvature for the semiconductor wafer based on the angle of reflection of the laser beam.

5. The method for simultaneously measuring thickness and composition of a film of claim 1 wherein measuring the thickness of the film comprises:
    measuring film thickness by ellipsometry.

6. A method for simultaneously measuring thickness and composition of a film, comprising:
    providing a semiconductor wafer having an upper surface;
    forming a film having an inherent internal stress on the upper surface of the semiconductor wafer;
    supporting the semiconductor wafer on a flat surface;
    illuminating a first predetermined location on the semiconductor wafer with a first light beam;
    simultaneously illuminating a second predetermined location of the semiconductor wafer with a second light beam which has a predetermined polarization characteristic in such a way as to form a reflected second light beam having a polarization characteristic which depends upon film thickness;
    measuring curvature of the semiconductor wafer based on an angle of reflection of the first light beam;
    measuring film thickness by comparing polarization characteristic of the reflected second light beam with the predetermined polarization characteristic of the second light beam;
    calculating strain in the film based on film thickness and curvature of the semiconductor wafer; and
    calculating film composition based on the strain.

* * * * *